(12) United States Patent
Goebel

(10) Patent No.: US 6,787,115 B2
(45) Date of Patent: Sep. 7, 2004

(54) PASSIVE ELEMENT FOR FUEL PROCESSOR START UP TRANSIENT TEMPERATURE CONTROL

(75) Inventor: Steven G. Goebel, Victor, NY (US)

(73) Assignee: General Motors Corporation, Detroit, MI (US)

( * ) Notice: Subject to any disclaimer, the term of this patent is extended or adjusted under 35 U.S.C. 154(b) by 586 days.

(21) Appl. No.: 09/878,493

(22) Filed: Jun. 11, 2001

(65) Prior Publication Data

US 2002/0187087 A1 Dec. 12, 2002

(51) Int. Cl.[7] .................................................. F17D 3/00
(52) U.S. Cl. ...................................................... 422/198
(58) Field of Search ............................. 429/19, 20, 24; 422/198, 105; 48/192

(56) References Cited

U.S. PATENT DOCUMENTS

| | | | |
|---|---|---|---|
| 4,293,315 A | 10/1981 | Sederquist | |
| 4,642,272 A | 2/1987 | Sederquist | |
| 4,650,727 A | 3/1987 | Vanderborgh et al. | |
| 4,659,634 A | 4/1987 | Struthers | |
| 4,670,359 A | 6/1987 | Beshty et al. | |
| 4,816,353 A | 3/1989 | Wertheim et al. | |
| 4,985,212 A | * 1/1991 | Kawakami et al. | ......... 422/179 |
| 5,271,916 A | 12/1993 | Vanderborgh et al. | |
| 5,484,577 A | 1/1996 | Buswell et al. | |
| 6,162,404 A | * 12/2000 | Tojo et al. | ................... 422/179 |
| 6,649,137 B2 | * 11/2003 | Bergeron et al. | ........... 423/372 |
| 2004/0076794 A1 | * 4/2004 | Hijikata | ..................... 428/116 |

FOREIGN PATENT DOCUMENTS

WO    WO 98/08771    3/1998

OTHER PUBLICATIONS

Hall et al., "A Porous Media Burner for Reforming Methanol for Fuel Cell Powered Electric Vehicles," SAE Paper #950095, no date avail.
Natural Gas Power Plant System (a descriptive drawing), no date avail.

* cited by examiner

Primary Examiner—Tom Dunn
Assistant Examiner—Jonathan Johnson
(74) Attorney, Agent, or Firm—Cary W. Brooks, Esq.; Linda M. Deschere, Esq.

(57) ABSTRACT

A fuel processor for a fuel cell includes a thermal start device, a mixing region and a temperature control element. The temperature control element is located between the thermal start device and the mixing region. The temperature control element reduces temperature increase in the mixing region during thermal startup. A flame arrestor is connected to the mixing region. A primary reactor is connected to the flame arrestor. The transient temperature control element has a body defining an inlet and an outlet. A plurality of bores are formed in the body.

13 Claims, 5 Drawing Sheets

US 6,787,115 B2

PASSIVE ELEMENT FOR FUEL PROCESSOR START UP TRANSIENT TEMPERATURE CONTROL

FIELD OF THE INVENTION

The present invention relates to fuel cells, and more particularly to transient temperature control of the fuel processor during startup.

BACKGROUND OF THE INVENTION

Fuel cells are increasingly being used as a power source in a wide variety of different applications. Fuel cells have also been proposed for use in electrical vehicle power plants to replace internal combustion engines. The acceptance of fuel cells by drivers will be governed, in part, by their experience with vehicles powered by the internal combustion engine. Consumers have grown accustomed to the relatively quick starting times of internal combustion engines. One challenge facing fuel cell designers is to provide a similar relatively quick starting time for fuel cells. This is made difficult by the relatively high operating temperatures of some of the components of fuel cells such as the primary reactor of the fuel processor.

A solid-polymer-electrolyte membrane (PEM) fuel cell includes a membrane that is sandwiched between an anode and a cathode. To produce electricity through an electrochemical reaction, hydrogen ($H_2$) or reformate is supplied to the anode and air or oxygen ($O_2$) is supplied to the cathode. In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane while the electrons flow through an electrical load that is connected across electrode plates. In a second half-cell reaction, oxygen ($O_2$) at the cathode reacts with protons ($H^+$) and electrons ($e^-$) are taken up to form water ($H_2O$).

A fuel cell can be operated using pure hydrogen. When hydrogen is used, the fuel cell has zero emissions since the product of the fuel cell is water. Fuel cells that use pure hydrogen as fuel, however, have significant commercial disadvantages. Currently, there is no commercial distribution system for hydrogen. Hydrogen is also difficult to store and distribute, so it would be much more convenient if fuel cells use fuels that are more readily available. As such, a fuel processor is typically used to convert fuels other than pure hydrogen into hydrogen. For example, the fuel processor can reform hydrocarbon or alcohol fuels such as natural gas, propane and methanol into hydrogen, which is then supplied to the fuel cell. The main function of the fuel processor in a fuel cell system is to provide a continuous stream of hydrogen to the fuel cell stack which converts the chemical energy in the hydrogen fuel to electric power. After start-up, the fuel cell stack demands a certain flowrate of hydrogen from the fuel processor to meet the vehicle's demand for power.

The reformation process is typically optimized at high temperatures (about 600–800° C.) relative to ambient tempertures. Thus, it is necessary that the catalytic reactors in the system (i.e., primary reformer and any associated secondary reformers such as water gas shift reactors or preferential oxidation reactors) are heated to a temperature sufficient to fully optimize there reformation process. During operation, the heat generated at various stages of the reforming process can be distributed and thereby controlled for optimum operation. During start-up, however, the reforming process must be modified so that operation of the various components are staged. This approach can lead to undesirable lag time for bring the system on-line. Alternately, external electrical heat sources (i.e., heaters) may be employed to bring the components to proper operating temperatures. This approach requires an external source of electricity such as a battery.

Accordingly, there exists a need in the relevent art to provide a system that is capable of heating the reforming system to operating temperatures upon start-up. Furthermore, there exists a need to provide a system that maximizes heat input into the reforming system while reducing large transient temperature variations during start-up.

SUMMARY OF THE INVENTION

A fuel processor for a fuel cell system according to the invention includes a thermal start device, a mixing region and a temperature control element. The temperature control element is located between the thermal start device and the mixing region. The temperature control element is a passive device that reduces transient temperature variation during thermal startup.

In other features of the invention, a flame arrestor is connected to the mixing region. A primary reactor is connected to the flame arrestor.

According to still other features of the invention, the transient temperature control element has a body defining an inlet and an outlet. A plurality of bores form passages between the inlet and the outlet. In a preferred embodiment, the temperature control element has a cylindrical shape.

According to other features of the invention, a reduction in transient temperature variation that is provided by the temperature control element is related to a number of bores formed in the end plate, a length of the temperature control element, and an area of the passages.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or its uses.

Figure 1:
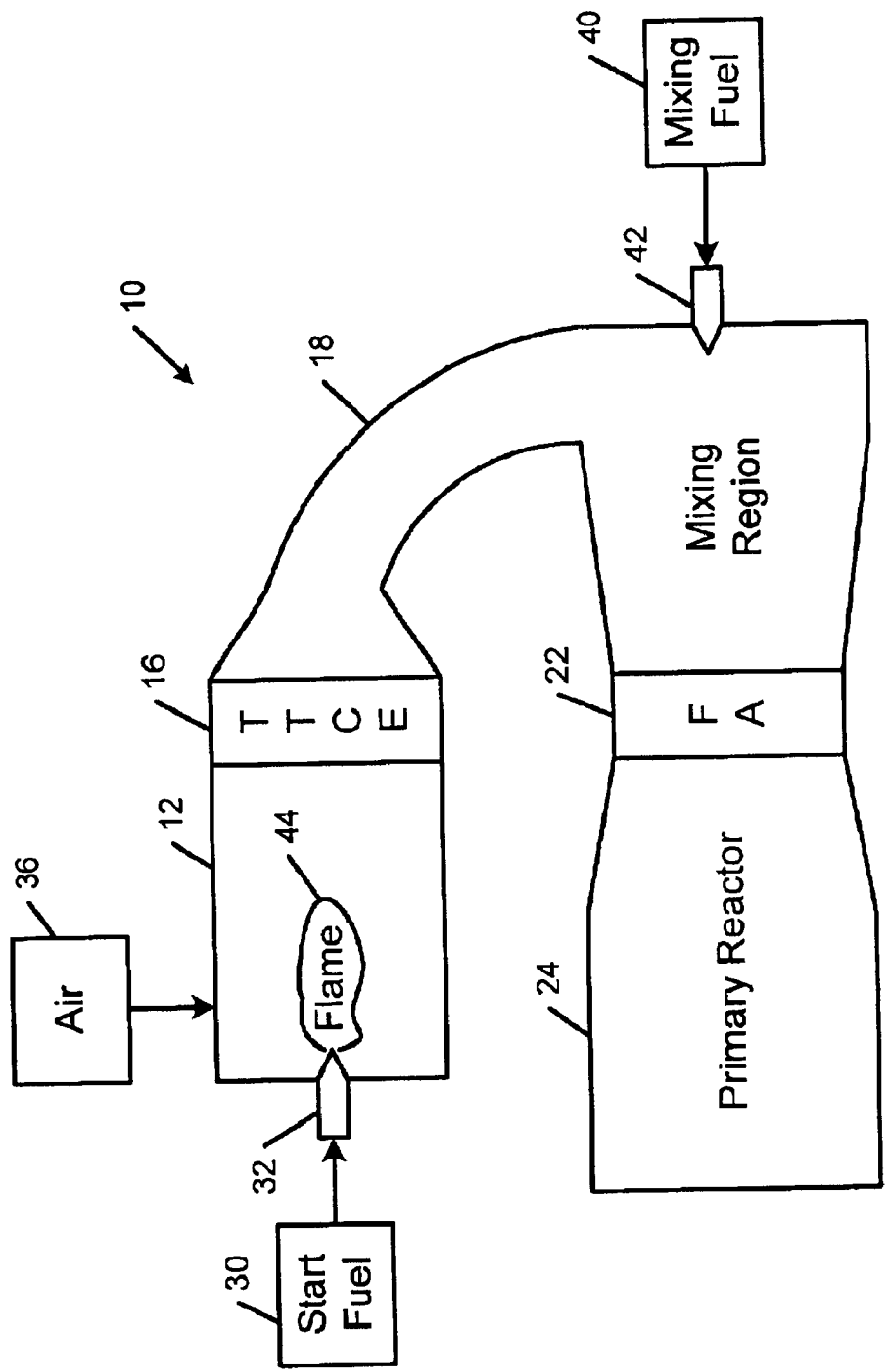
FIG. 1 illustrates a transient temperature control element according to the present invention that is located between a thermal start device and a mixing region of fuel cell processor.
Figure 2:
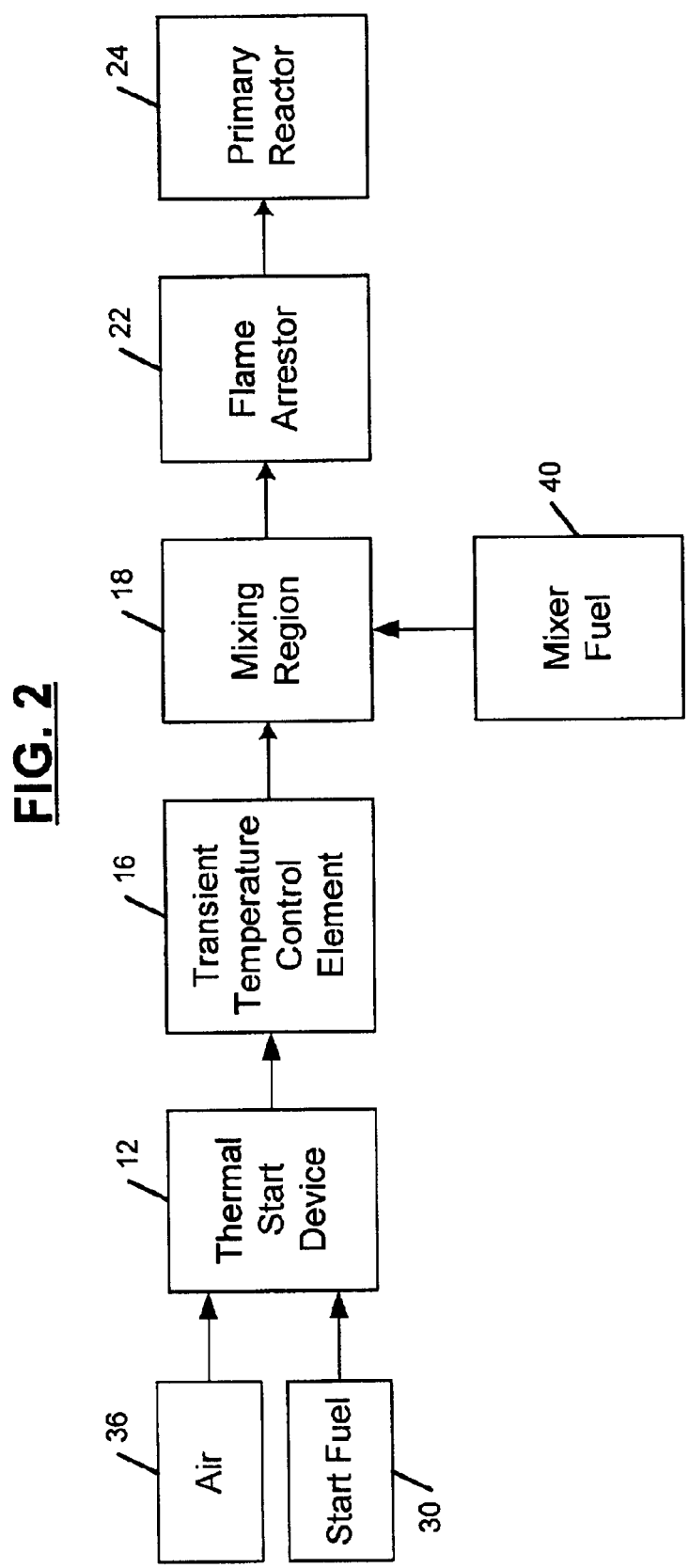
FIG. 2 illustrates a schematic block diagram of the transient temperature control element and the fuel cell processor shown in FIG. 1.

Referring now to FIGS. 1 and 2, a fuel processor 10 according to the present invention is illustrated. The fuel processor 10 is adapted for use in a fuel cell system for transmitting hydrocarbon or alcohol fuels into hydrogen which is then supplied to the fuel cell. The fuel processor 10 for reforming hydrocarbon or alcohol fuels includes a thermal start device 12, a mixing region 18, a flame arrestor 22 and a primary reactor 24. When starting up the fuel cell system, the primary reactor 24 is heated to a light-off temperature between 350–400° C. Generally, a fuel-rich flame at 1200° C. from the thermal start device 12 is used to heat a catalyst (not shown) in the primary reactor 24. A mixing region 18 is located upstream from the primary reactor 24. During normal operation, fuel is introduced into the mixing region 18. The heat that is supplied to heat the catalyst in the primary reactor 24 also heats the mixing region 18. Auto-ignition of the fuel in the mixing region 18 occurs above 600° C. Ideally, the catalyst in the primary reactor 24 is heated to its light-off temperature without reaching auto-ignition temperatures in the mixing region 18.

Thermal start device 12 is a fuel-rich device that operates at 1200° C. for flame stability but can overheat the mixing region 18 to temperatures above 600° C. Overheating occurs if the mixing region 18 exceeds 600° C. before the primary reactor catalyst reaches its light-off temperature (typically 350° C.). When the mixer fuel is injected into the mixing region 18, it auto-ignites within the mixing region 18. Gas phase reactions within the mixing region 18 also cause carbon formation. Once initiated, the gas phase reactions will continue in the mixing region 18 and the flame will not be extinguished under normal operating conditions.

The reaction of fuel, air and steam must occur only on the catalyst in the primary reactor to avoid carbon formation may plug the primary reactor. In addition, the mixer fuel is initiated before the primary reactor is warmed to its light-off temperature, unreacted fuel passes through the primary reactor. The unreacted fuel damages downstream catalysts and adds to the exhaust emissions. Significantly reducing or eliminating exhaust emissions is one of the primary goals of fuel cell designs.

To this end, transient temperature control element 16 is located between the thermal start device 12 and a mixing region 18. A flame arrestor 22 is located between the mixing region 18 and a primary reactor 24. Starting fuel from a fuel source 30 is introduced by an injector 32 into the thermal start device 12. Air 36 is also delivered to the thermal start device 12. The thermal start device 12 is operable to heat a catalyst in the primary reactor 24 to its light-off temperature. Mixing fuel from a mixing fuel source 40 is preferably provided by an injector 42 into the mixing region 18 after the primary reactor 24 reaches the light-off temperature.

When starting up the fuel cell system, the primary reactor 24 must be heated to its light-off temperature, which is typically between 350–400° C. Generally, the heated gas generated by a fuel-rich flame 44 that is typically at 1200° C. is used to heat the catalyst in the primary reactor 24. However, because the mixing region 18 is located upstream from the primary reactor 24, the heat used to heat the primary reactor catalyst to its light-off temperature also increases the temperature of the mixing region 18. Auto-ignition of the mixing fuel 40 injected into the mixing region 18 will occur above 600° C. Upon auto-ignition, gas phase reactions within the mixing region 18 cause carbon formations. Once initiated, the gas phase reactions will continue in the mixing region 18 and the flame within the mixing region 18 is not extinguished under normal operating conditions. Therefore, the primary reactor 24 must be heated to its light-off temperature without causing auto-ignition in the mixing region 18.

To alleviate these problems, the transient temperature control element 16 according to the present invention is inserted between the thermal start device 12 and the mixing region 18. The transient temperature control element 16 has appropriate dimensions to affect a desired temperature reduction of the gas and to control transient temperature changes during the startup phase. The transient temperature control element 16 must also have an appropriate thermal mass to perform the temperature reducing function over a sufficient amount of time to allow the catalyst in the primary reactor 24 to heat to its light-off temperature before the mixing region 18 overheats.

The reaction of fuel, air and steam must occur only on the catalyst in the primary reactor 24 to avoid carbon formation. Carbon formation is undesirable because the carbon particles plug the primary reactor 24. If the mixer fuel 40 is introduced before the primary reactor 24 is warmed to its light-off temperature, unreacted fuel will pass through the primary reactor 24, damage downstream catalysts, and add to the exhaust emissions.

As is illustrated in FIGS. 1 and 2, the transient temperature control element 16 is positioned between the thermal start device 12 and the mixing region 18. The transient temperature control element 16 is preferably a cylinder that is fitted to the inside of a pipe between the thermal start device 12 and the mixing region 18. The transient temperature control element 16 preferably has a significant number of bores formed in the body to allow the heated gas to flow therethrough and to provide the desired heat transfer. In a preferred embodiment, the transient temperature control element has approximately 100 to 500 bores. For a given start-up flow condition, the diameter, length and number of bores in the transient temperature control element 16 are selected to provide the desired temperature reduction and to determine the rate of heating of the transient temperature control element 16 as will be described more fully below.

Figure 3:
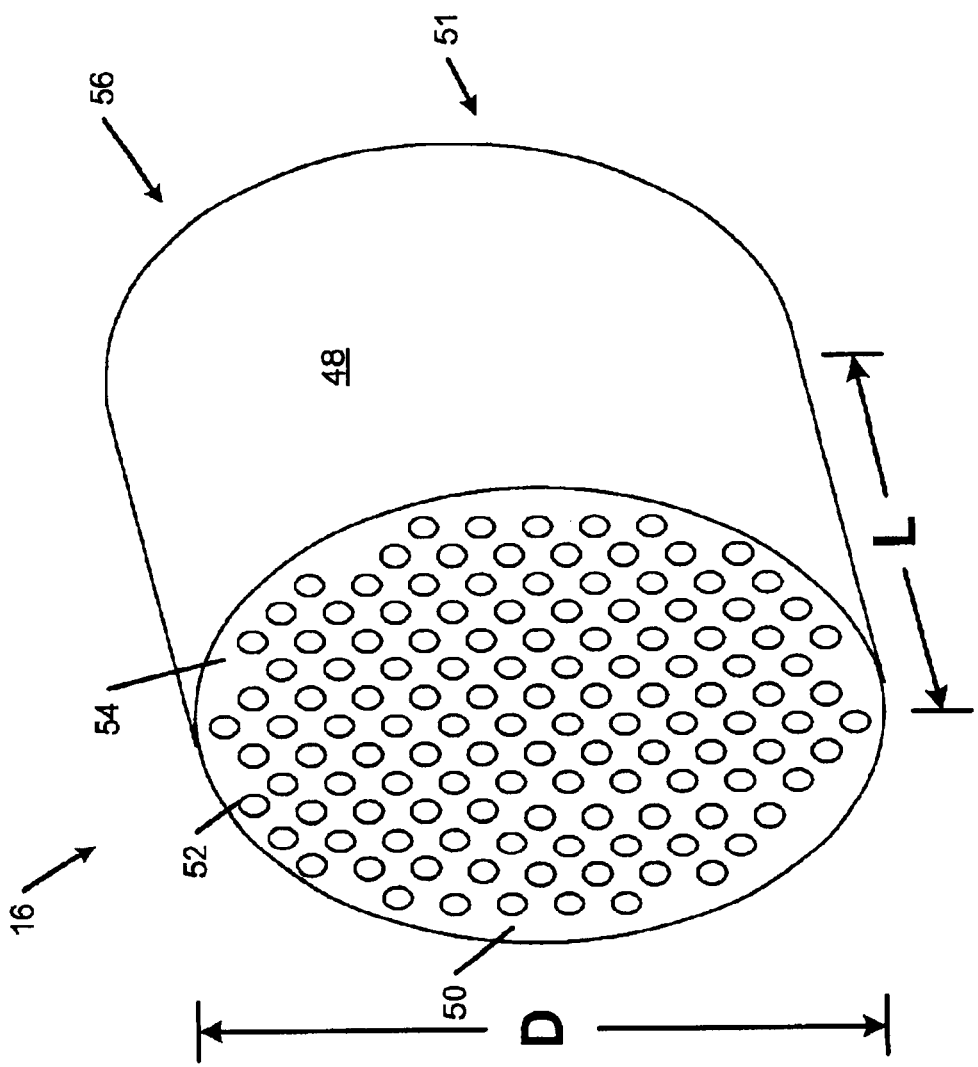
FIGS. 3A and 3B are simplified views of the transient temperature control element of FIG. 1.
Figure 4:
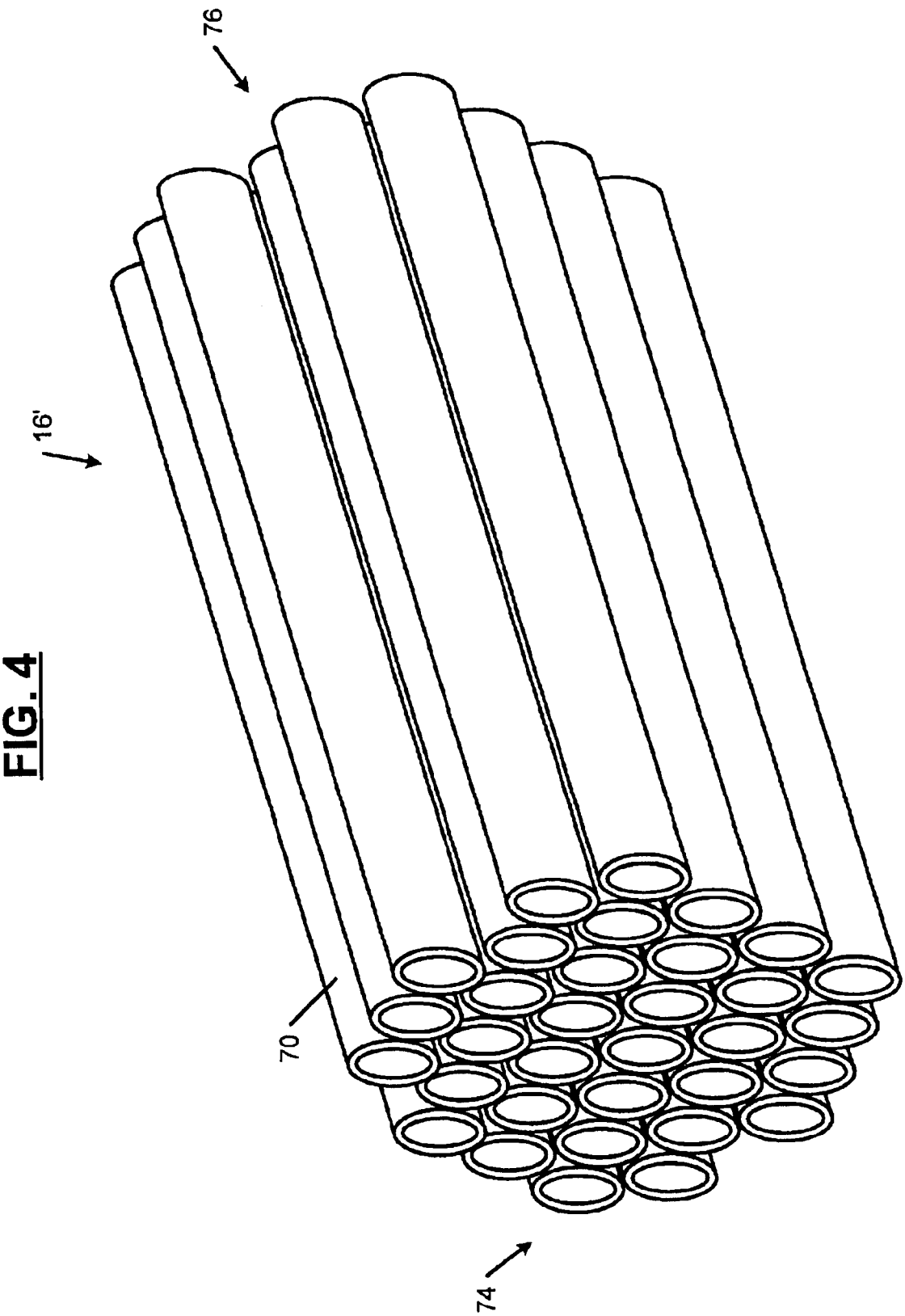
FIG. 4 is a cross-section perspective view of a modified version of the transient temperature control element shown in FIG. 3A.

Referring now to FIGS. 3A and 3B, the transient temperature control element 16 is illustrated. In a preferred embodiment, the transient temperature control element 16 is a solid cylinder having a length L and a diameter D. The transient temperature control element 16 has an outer side surface 48 and opposite circular end surfaces 50 and 51 with a plurality of cylindrical bores 52 extending therebetween. The cylindrical bores 52 effectuate the desired heat transfer. The end surface 50 defines an inlet 54 that is located adjacent to an outlet of the thermal start device 12. Likewise, the opposite end surface 51 of the body 48 defines an outlet 56 that is located adjacent to an inlet of the mixing region 18. While the preferred embodiment contemplates use of a transient temperature control element 16 with a body having cylindrical bores formed therein, it is considered to be a possible optional construction to employ a plurality of tubes. Specifically, FIG. 4 shows a modified temperature control element 16' having a plurality of tubes 70 with an inlet end 74 and an outlet end 76. The number, size and orientation of the tubes is selected to provide the desired flow and heat transfer characteristics.

While the bores 52 of the transient temperature control element 16 depicted in FIG. 3A have a circular cross-section, other cross-sections may be employed without departing from the spirit and scope of the invention. For example, the cross-section can be elliptical, square, rectangular or other shapes to fit the geometry between the thermal start device 12 and the mixing region 18. The calculations that are set forth below with respect to circular cylindrical bores would be correspondingly revised based upon the particular cross-section selected. As noted, the transient temperature control element 16 includes a plurality of bores 52. In a preferred embodiment, the bores 52 have a circular cross-section. Skilled artisans can appreciate that the bores 52 may have a cross-section with another shape such as a square, ellipse, rectangle, or other shapes.

The design parameters that impact the desired temperature reduction of the transient temperature control element 16 are set forth below:

$$m_{gas} cp_{gas}(T_{gas}-T_{out})=h\ N\pi d\ L(T_{gas}-T)$$

where $T_{gas}$ is the temperature of gas from the thermal start device 12 (typically 1200° C.). $m_{gas}$ is the mass flow of gas (typically 0.005 kg/s). $cp_{gas}$ is a specific heat of gas (typically 1300 J/kg-K). $T_{out}$ is the temperature of gas from the transient temperature control element 16 (° C., to be solved for). h is the heat transfer coefficient for the bores 52 in the transient temperature control element 16 (based on Nu=3.66 where Nu=h d/$k_{gas}$). N is the number of bores 52 in the transient temperature control element 16 (e.g. 300). d is the diameter of the bores 52 in the transient temperature control element 16 (e.g. 0.002 m). L is the length of the transient temperature control element 16 (e.g. 0.038 m). T is the temperature of the transient temperature control element 16 (° C., to be solved for).

The rate of heating of the transient temperature control element 16 during the start process is governed by the following equation:

$$m\ cp\ dT/dt=h\ N\pi d\ L(T_{gas}-T)$$

where m is the mass of the transient temperature control element (e.g. 1.1 kg). cp is the specific heat of the transient temperature control element (e.g. 500 J/kg-K). dT/dt is the time derivative of the temperature T of the transient temperature control element 16. The equations set forth above are solved simultaneously.

Figure 5:
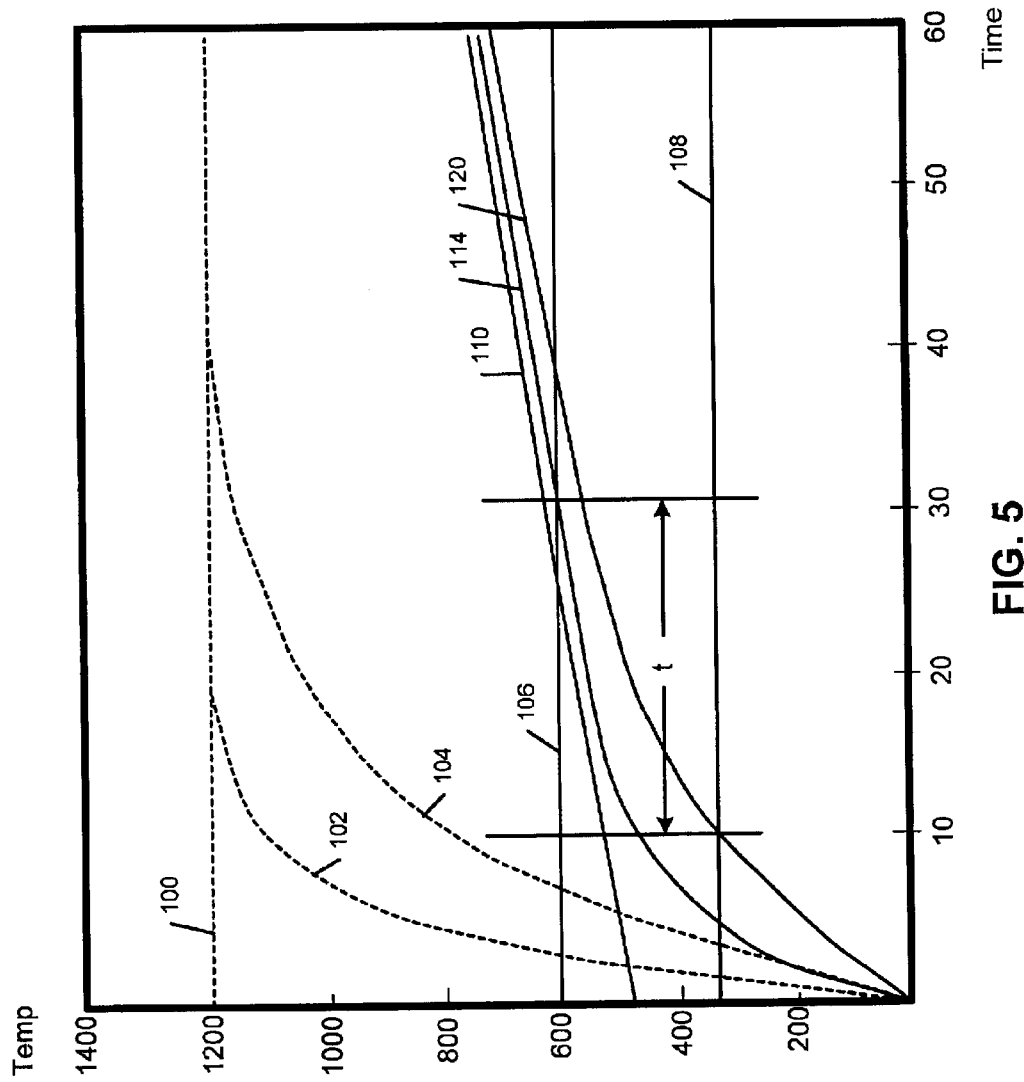
FIG. 5 illustrates projected temperature responses of the fuel processor shown in FIG. 1 equipped with the transient temperature control element of FIGS. 3A and 3B.

Referring now to FIG. 5, predicted temperature vs. time responses for the fuel processor with and without the transient temperature control element 16 are shown. In particular, dotted line 100 represents the temperature of gas flowing from the starting device 12 into the mixing region 18 of the fuel processor 10 without the transient temperature control element 16. Dotted line 102 represents the temperature of the mixing region 18 of the fuel processor 10 without the transient temperature control element 16. Dotted line 104 represents the temperature of the gas entering the primary reactor 24 of the fuel processor 10 without the transient temperature control element 16. Solid line 106 represents the temperature for auto-ignition in the mixing region 18. As can be appreciated, the lines 102 and 104 are below the auto-ignition temperature for only a very brief time period. Solid line 108 represents the temperature for primary reactor 24 light-off. Solid line 110 represents the temperature of gas flowing into the mixing region 18 of the fuel processor 10 equipped with the transient temperature control element 16. Solid line 114 represents the temperature of the mixing region 18 of the fuel processor 10 equipped with the transient temperature control element 16. Solid line 120 represents the temperature of the gas flowing into the primary reactor 24 of the fuel processor 10 equipped with the transient temperature control element 16. A time period "t" identifies the time available for transition to mixer fuel 40 when the transient temperature control element 16 is employed.

An exemplary design is illustrated by the temperature curves depicted in FIG. 5. For these curves, the mixing region surface temperature was based on a 0.0015 m cylinder with a density of 4000 kg/m³ and a specific heat of 750 J/kg-K. These values reflect the temperature response of a thermocouple within this region or the surface of the flame arrestor 22 that could act as ignition sources upon transition to the mixer fuel 40. As noted, the transient temperature control element 16 is shaped like a cylinder. The flame arrestor 22 has a thermal mass of 0.09 kg and a specific heat of 750 J/kgK, which would represent a porous ceramic foam that is 0.025 m thick.

The results illustrated in FIG. 5 demonstrate the benefits of the transient temperature control element 16. Without the transient temperature control element 16, the temperature in the mixing region 18 exceeds the auto-ignition temperature before the temperature in the catalyst in the primary reactor 24 is above its light-off temperature. In contrast, the transient temperature control element 16 provides a window of approximately 18 seconds during which the temperature of the primary reactor 24 is above its light-off temperature and the mixing region 18 temperature is below its auto-ignition temperature. During this time window, the transition from start fuel 30 to mixer fuel 40 can be made for normal operation without risk of auto-ignition in mixing region 18 or unreacted fuel passing through the primary reactor 24.

Those skilled in the art can now appreciate from the foregoing description that the broad teachings of the present invention can be implemented in a variety of forms. Therefore, while this invention has been described in connection with particular examples, thereof, the true scope of the invention should not be so limited since other modifications will become apparent to the skilled practitioner upon a study of the drawings, the specification and the following claims.

What is claimed is:

1. A fuel processor for a fuel cell, comprising:
   a thermal start device;
   a mixing region; and
   a temperature control element located between said thermal start device and said mixing region, wherein said temperature control element reduces temperature increase in said mixing region during thermal startup.

2. The fuel processor of claim 1 further comprising:
   a flame arrestor connected to said mixing region; and
   a primary reactor connected to said flame arrestor.

3. The fuel processor of claim 1 wherein said temperature control element has a cylindrical shape with opposite end surfaces and bores formed between said end surfaces.

4. The fuel processor of claim 1 wherein said transient temperature control element has a body defining an inlet and an outlet and a plurality of bores formed through said body from said inlet to said outlet.

5. The fuel processor of claim 4 wherein a reduction in temperature increase in said mixing region that is provided by said temperature control element is related to a number of said bores forming passages through said body, a length of said temperature control element, and a surface area of said passages.

6. The fuel processor of claim 1 wherein said temperature control element is passive.

7. A fuel processor having a temperature control element, said element comprising:
   a body;
   an inlet located at one end of said body;
   an outlet located at an opposite end of said body; and
   a plurality of bores forming passages from said inlet to said outlet.

8. The temperature control element of claim 7 wherein said temperature control element is located between a thermal start device and a mixing region of said fuel processor.

9. The temperature control element of claim 8 wherein said temperature control element reduces temperature increase in said mixing region during thermal startup.

10. The temperature control element of claim 7 wherein said body has a cylindrical shape and said bores have a circular cross-section.

11. The temperature control element of claim 8 further comprising:
   a flame arrestor connected to said mixing region; and
   a primary reactor connected to said flame arrestor.

12. The temperature control element of claim 8 wherein a reduction in temperature increase in said mixing region is related to a number of said bores formed in said body, a length of said temperature control element, and an area of said passages.

13. The temperature control element of claim 7 wherein said temperature control element is passive.

* * * * *